United States Patent [19]

Matsunaga

[11] Patent Number: 5,480,216
[45] Date of Patent: Jan. 2, 1996

[54] HYDRAULIC CONTROL APPARATUS OF LOAD-RESPONSE TYPE

[75] Inventor: Kunihiro Matsunaga, Yamanashi, Japan

[73] Assignee: Tokico, Ltd., Kanagawa, Japan

[21] Appl. No.: 362,779

[22] Filed: Dec. 23, 1994

[30] Foreign Application Priority Data

Dec. 27, 1993 [JP] Japan ................... 5-352236

[51] Int. Cl.$^6$ .................. B60T 8/18; B60T 8/32
[52] U.S. Cl. .................. 303/9.69; 303/9.68
[58] Field of Search .................. 303/9.62, 9.67–9.71

[56] References Cited

U.S. PATENT DOCUMENTS

| | | | |
|---|---|---|---|
| 3,806,207 | 4/1974 | Reinecke et al. | 303/9.69 |
| 4,111,495 | 9/1978 | Peeples | 303/9.69 |
| 4,113,318 | 9/1978 | Doi | 303/9.68 |
| 4,353,600 | 10/1982 | Uchihara et al. | 303/9.67 |
| 4,560,208 | 12/1985 | Kubota | 303/9.67 |
| 4,615,566 | 10/1986 | Perrin | 303/9.69 |

*Primary Examiner*—Robert J. Oberleitner
*Assistant Examiner*—Chris Schwartz
*Attorney, Agent, or Firm*—Wenderoth, Lind & Ponack

[57] ABSTRACT

A load-responsive hydraulic control apparatus includes a valve operating member for opening a valve portion capable of permitting and preventing a master cylinder from communicating with the rear wheel cylinders of a rear wheel brake system. A plunger is provided for receiving hydraulic pressure from a branch path branched from the rear wheel brake system between the valve portion and the master cylinder and for opening the valve portion via the valve operating member when the received hydraulic pressure reaches predetermined hydraulic shifting pressure. An inertia valve blocks the branch path when predetermined deceleration is achieved.

4 Claims, 2 Drawing Sheets

HYDRAULIC CONTROL APPARATUS OF LOAD-RESPONSE TYPE

BACKGROUND OF THE INVENTION

1. Field of the Invention

The present invention relates to a load-responsive hydraulic control apparatus wherein, if hydraulic braking pressure is increased above a predetermined cut point hydraulic pressure during braking, hydraulic pressure in the rear wheel cylinders becomes less than that in the front wheel cylinders to prevent the vehicle from spinning, and wherein the cut point hydraulic pressure will vary in accordance with the vehicle load (load supported by the vehicle).

2. Related Background Art

With a known hydraulic control apparatus, if hydraulic braking pressure generated during a braking action is increased above a predetermined cut point hydraulic pressure, the hydraulic pressure in the rear wheel cylinders becomes lower than the hydraulic pressure in a master cylinder and accordingly the hydraulic pressure in the front wheel cylinders connected directly to the master cylinder (cut control) to prevent the vehicle from spinning.

When such a hydraulic control apparatus is incorporated into a so-called front and rear piping type of brake system having a front wheel brake system connecting a master cylinder and front wheel cylinders, and a rear wheel brake system connecting the master cylinder and rear wheel cylinders, the hydraulic control apparatus is provided in-line with the rear wheel brake system.

By the way, when the above-mentioned front and rear piping type of brake system is used, if the cut control of the rear wheel brake system is effected upon a malfunction of the front wheel brake system, there is a danger of lowering the braking force. To avoid this, the conventional hydraulic control apparatus is so designed that the hydraulic pressure of the front wheel brake system is introduced into the hydraulic control apparatus so that, if the hydraulic pressure of the front wheel brake system becomes substantially zero, the cut control cannot be effected (that is to say, the transmission of the hydraulic pressure between the master cylinder and the rear wheel cylinders is not prevented).

On the other hand, among the hydraulic control apparatuses, a load-responsive hydraulic control apparatus is known wherein the cut point hydraulic pressure is changed in accordance with the vehicle load (i.e., when the load is great the cut point hydraulic pressure is a higher value than when the load is small). In such a load-responsive hydraulic control apparatus, for example, since a force must be introduced into the hydraulic control apparatus in accordance with a distance between an axle of the rear wheels and the vehicle body to change the operation of the apparatus, the hydraulic control apparatus is mounted proximate the axle of the rear wheels.

However, when the hydraulic control apparatus is applied to the front and rear piping type of brake system, a pipe branched from the front wheel brake system must be connected to the hydraulic control apparatus for the purpose of detecting a malfunction of the front wheel brake system. This makes the entire system expensive. Further, since the malfunction of the front wheel brake system is detected by the hydraulic pressure in the front wheel brake system, if the hydraulic pressure in the front wheel brake system does not become zero, but the braking ability becomes impaired due for example, to fade, vapor-lock or the like, the cut control is performed, thereby further impairing the braking ability.

SUMMARY OF THE INVENTION

Accordingly, an object of the present invention is to provide a load-responsive hydraulic control apparatus wherein, even when the apparatus is applied to a front and rear piping type of brake system, a pipe connecting the front wheel brake system with the apparatus is not required, thereby curtailing the cost of the entire system, and wherein, if the braking ability of the front wheel brake system is impaired even though normal hydraulic pressure is generated in the front wheel brake system, the cut control is prevented, thereby ensuring that a sufficient braking force is produced in the rear wheel brake system.

To achieve the above object, a load-responsive hydraulic control apparatus comprises a valve portion for permitting and preventing communication between a master cylinder and wheel cylinders of the rear wheel brake system; a valve operating portion capable of moving to and separating from the valve portion and adapted to close the valve portion when it is separated from the valve portion; a control piston for holding the valve portion and designed so that it is shifted when hydraulic braking pressure of the master cylinder reaches a predetermined cut point hydraulic pressure, thereby separating the valve portion from the valve operating portion to prevent communication between the master cylinder and the wheel cylinders of the rear wheel brake system. The control piston is reciprocally shifted when the hydraulic braking pressure of the master cylinder is further increased, thereby causing the valve portion and the valve operating portion to repeatedly move to and separate from one another to decrease the hydraulic braking pressure transmitted to the rear wheel cylinders, at a predetermined rate, relative to the hydraulic braking pressure of the master cylinder. The apparatus also comprises an input member for inputting a force corresponding to a vehicle load to the piston to cause the valve portion to move to the valve operating portion; a branch path branched from the rear wheel brake system between the valve portion and the master cylinder; a plunger for receiving hydraulic pressure from the branch path and for positioning the valve operating portion at a valve portion approach position when the received hydraulic pressure reaches a predetermined hydraulic shifting pressure; and an inertia valve for blocking the branch path when predetermined deceleration is achieved.

In the load-responsive hydraulic control apparatus according to the present invention, when the front wheel brake system is normal, the predetermined deceleration of the vehicle can be achieved in accordance with the hydraulic braking pressure generated by the master cylinder. As a result, the branch path is blocked by the inertia valve, so that the hydraulic pressure received by the plunger does not reach the hydraulic shifting pressure. Thus, the control piston is shifted when the hydraulic braking pressure of the master cylinder reaches the predetermined cut point hydraulic pressure, thereby separating the valve portion from the valve operating portion to prevent communication between the master cylinder and the wheel cylinders of the rear wheel brake system. The control piston is shifted when the hydraulic braking pressure of the master cylinder is further increased, whereby the valve portion and the valve operating portion repeatedly move to and separate from one another to decrease the hydraulic braking pressure transmitted to the rear wheel cylinders, at a predetermined rate, relative to the hydraulic braking pressure of the master cylinder (performance of the cut control).

On the other hand, if the front wheel brake system becomes abnormal, the predetermined deceleration of the vehicle cannot be achieved even when the hydraulic braking pressure generated by the master cylinder is increased. As a result, the branch path is not blocked by the inertia valve, so that the hydraulic pressure received by the plunger is increased to the hydraulic shifting pressure, thereby allowing the valve operating portion to be shifted to the valve portion approach by the plunger. Consequently, the valve portion is opened, thereby cancelling the cut control.

As mentioned above, the cut control is canceled by the inertia valve if an abnormality of the front wheel brake system is detected. Thus, a pipe connecting the front wheel brake system to the apparatus is not required. Further, even if the braking ability of the front wheel brake system is impaired even while normal hydraulic pressure exists in the front wheel brake system, the cut control is cancelled.

DETAILED DESCRIPTION OF THE PREFERRED EMBODIMENTS

Now, a load-responsive hydraulic control apparatus according to the present invention will be described with reference to the accompanying drawings.

Figure 1:
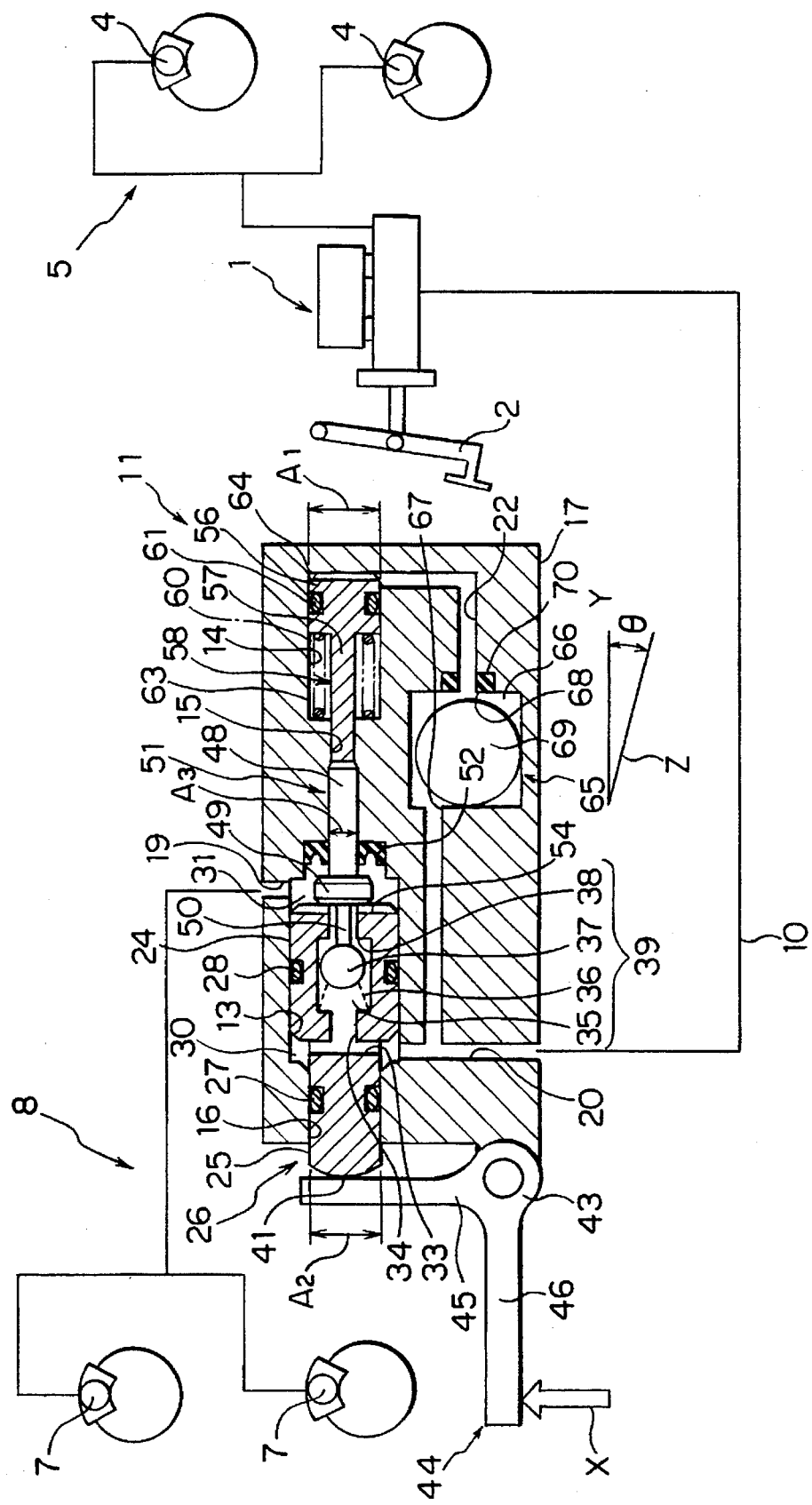
FIG. 1 is a schematic illustration of a brake system into which an embodiment of a load-responsive hydraulic control apparatus according to the present invention is incorporated.

In FIG. 1, a tandem master cylinder 1 is connected to a brake pedal 2 and has two hydraulic pressure generating chambers (not shown) for generating hydraulic braking pressure in response to depression of the brake pedal 2. One of the hydraulic pressure generating chambers is connected to two front wheel cylinders 4 through a front wheel brake system 5, and the other hydraulic pressure generating chamber is connected to two rear wheel cylinders 7 through a rear wheel brake system 8, thereby providing a so-called front and rear piping type of brake system. Now, in FIG. 1, the vehicle travelling direction is towards the right. Incidentally, the wheel cylinders 4, 7 are hydraulically operated devices such as disc brakes or drum brakes.

In the rear wheel brake system 8, the load-responsive hydraulic control apparatus 11 according to the present invention is provided in a path 10 between the rear wheel cylinders 7 and the master cylinder 1.

The hydraulic control apparatus 11 comprises a casing 17 having a first bore portion 13, a second bore portion 14, and a through-bore portion 15 for placing the first and second bore portions in communication with each other, which bore portions 13, 14, 15 are disposed coaxially. An end of the first bore portion 13 remote from the through-bore portion 15 communicates with a coaxial and smaller bore 16 open to the outside of the casing 17.

An output port 19 always communicating with the rear wheel cylinders 7 is connected to an end of the first bore portion 13 near the through-bore portion 15, and an input port 20 always communicating with the master cylinder 1 is connected to the end of the first bore portion 13 near the smaller bore 16. An end of the second bore portion 14 remote from the through-bore portion 15 communicates with an intermediate portion of the input port 20 through a branch path 22.

A stepped control piston 26 having a large diameter portion 24 fitted in the first bore portion 13 and a smaller diameter portion 25 fitted in the smaller bore 16 is slidably mounted in the casing 17. The control piston 26 has a seal ring 27 for permanently establishing a seal between the small diameter portion 25 and the surface of casing 17 defining the smaller bore 16, and a seal ring 28 for permanently establishing a seal between the large diameter portion 24 and the surface of the casing 17 defining the first bore portion 13.

The large diameter portion 24 and the seal ring 28 of the control piston 26 divide the first bore portion 13 into an input chamber 30 (near the smaller bore 16) always communicating with the input port 20 and an output chamber 31 (near the through bore 15) always communicating with the output port 19.

In addition, a first bore 33 extends radially through the control piston 26 at an end of the small diameter portion 25 near the large diameter portion 24, and a second bore 34 extends in the large diameter portion 24 from the first bore 33 in a direction away from the small diameter portion 25. The input chamber 30 communicates with the output chamber 31 through the first and second bores 33, 34.

A valve chamber 35 having a larger diameter is formed in the large diameter portion of control piston 16 at an intermediate portion of the second bore 34. A spring 36 and a valve body 37 biased toward the output chamber 31 by the spring 36 are disposed in the valve chamber 35. The valve body 37 is seated against a valve seat 38 defined between the valve chamber 35 and the second bore 34 (near the output chamber 31 ) by a biasing force of the spring 36 to close the second bore 34. Incidentally, in the illustrated embodiment, the valve chamber 35, spring 36, valve body 37 and valve seat 38 constitute a valve 39.

Further, the control piston 26 has a round free end 41 (at the small diameter portion 25 ) protruding from the casing 17. An arm portion 45 of an L-shaped load input lever (input member) 44 is pivotally mounted on the casing 17 at its base 43 and abuts the round end 41. When the vehicle load is increased, the distance between an axle of the rear wheels and the vehicle body decreases and a force acting in the direction shown by arrow X is applied to the other arm portion 46 of the load input lever 44, thereby urging the control piston 26 toward the output chamber 31.

A valve operating member (valve operating portion ) 51, having a guide rod 48 slidably fitted in the through bore portion 15, a flange portion 49 positioned in the output chamber 31 and connected to the guide rod 48, and an operating rod 50 extending from the flange portion 49 away from the guide rod 48 and capable of being inserted into the second bore 34 of the control piston 26 by a predetermined amount, is provided coaxially with the control piston 26 at an end of the control piston 26 near the through-bore 15.

The flange portion 49 has a diameter smaller than that of the first bore portion 13 of the casing 17 and greater than that of the second bore 34 of the control piston 26, and the operating rod 50 has a diameter smaller than that of the second bore 34 by a predetermined amount and a length greater, by a predetermined amount, than that part of the second bore portion 34 extending between the valve chamber 35 and the output chamber 31. Further, a seal member 52 for creating a seal between the guide rod 48 of the valve operating member 51 and the surface of casing 17 defining the through-bore 15 is provided in the end of the first bore portion 13 near the through-bore 15. Incidentally, a groove 54 is formed in the end surface of the control piston 26 near the through-bore 15 so that, even when the flange portion 49 contacts the end surface, the second bore 34 continues to communicate with the output chamber 31.

A plunger 58 has a head 56 slidably fitted in the second bore portion 14 and a shaft portion 57 extending from the head 56 and slidably fitted in the through-bore 15. A plunger spring 60 is disposed between the head 56 and a surface of casing 27 defining an end of the second bore portion 14 (near the through-bore 15) so as to bias the plunger 58 with a predetermined biasing force. A seal ring 61 for permanently establishing a seal between the head 56 of the plunger 58 and a surface of casing 17 defining the second bore portion 14 is provided around a peripheral surface of the head 56. The head 56 and the seal ring 61 divide the second bore portion 14 into an atmosphere chamber 63 which communicates with the atmosphere and within which the plunger spring 60 is disposed (near the through-bore 15), and an operating pressure chamber 64 opposed to the atmosphere chamber and communicating with the branch path 22.

An inertia valve 65 is disposed within the branch path 22. The inertia valve 65 has a valve chamber 66 disposed at an intermediate portion of the branch path 22. A part of the branch path 22 extending from the input port 20 opens into the valve chamber 66 at an upper opening 67 one end of the valve chamber, and another part of the branch path 22 extending from the second bore portion 14 opens into the valve chamber 66 at a control opening 68 in the other end of the valve chamber.

A valve body 69 made of steel and having a diameter smaller, by a predetermined amount, than the height of the valve chamber 66 is disposed within the valve chamber 66. Incidentally, the valve chamber 66 has a length (in a horizontal direction) greater, by a predetermined amount, than the diameter of the valve body 69. The distance between a bottom of the valve chamber 66 and the center of the second opening 68 is set to be equal to the radius of the valve body 69. A width (in a direction perpendicular to the sheet of FIG. 1) of the valve chamber is substantially the same as the diameter of the valve body 69.

The control apparatus is mounted in such a manner that the second opening 68 is disposed at the front of the valve chamber 66 with respect to the vehicle travelling direction, an axis (parallel with the line Y shown in FIG. 1) of the valve chamber in the front-to-rear direction of the vehicle is inclined with respect to a horizontal plane (shown by the line Z in FIG. 1) by a predetermined angle θ, the axis of the valve chamber being inclined upwardly in the vehicle travelling direction.

Thus, when the vehicle is accelerated, stopped or slightly decelerated, the valve body 69 is spaced from the second opening 68, whereby the branch path 22 is open.

On the other hand, when the deceleration of the vehicle exceeds a predetermined value, the valve body 69 rolls along the inclined bottom surface of the valve chamber 66 and thereby closes the second opening 68. Incidentally, a seal member 70 made of elastic material is provided around the second opening 68 to ensure the complete closing of the second opening 68 when the valve body 69 abuts against the end of the valve chamber 66.

Next, the operation of the load-responsive hydraulic control apparatus will be explained.

First of all, in a normal condition in which the load of the vehicle is small, hydraulic fluid at a braking pressure Lbar is introduced from the master cylinder 1 into the operating chamber 64 through the branch path 22 to act on a pressure receiving area (seal area) $A_1$ of the head 56 of the plunger 58 and is also introduced into the input chamber 30 to act on a pressure receiving area (seal area) $A_2$ of the small diameter portion 25 of the control piston 26. As a result, these two forces (associated with $A_1$, $A_2$) act on the plunger 58, valve operating member 51 and control piston 26 tending to shift them to the left in FIG. 1.

On the other hand, the hydraulic braking pressure Lbar also acts on a pressure receiving area (seal area) $A_3$ of the guide rod 48 of the valve operating member 51 in a direction opposite to the aforementioned two forces (i.e., rightward in FIG. 1). The biasing force of the plunger spring 60 and the vehicle load transmitted from the load input lever 44 also act in this direction.

In this case, the pressure receiving areas and the biasing force of the plunger spring 60 are selected so that the sum of the above-described three forces acting to the right in FIG. 1 is greater than the sum of the above-described two forces acting to the left in FIG. 1. As a result, the plunger 58, valve operating member 51 and control piston 26 are all shifted to the right (condition shown in FIG. 1).

When the hydraulic braking pressure Lbar is generated, the vehicle deceleration is αg. Deceleration of the vehicle at this value causes the valve body 69 to close the second opening 68, thereby blocking the branch path 22. As a result, there will be no increase in the hydraulic braking pressure acting on the plunger 58.

As the vehicle decelerates at αg or higher, when the hydraulic braking pressure of the master cylinder 1 reaches a predetermined cut point pressure, the force acting on the pressure receiving area $A_2$ will exceed the urging force of the load input lever 44, and the control piston 26 will shift to the left in FIG. 1. In this case, the hydraulic pressure acting on the plunger 58 does not increase because the inertia valve 65 closes the branch path 22. Further, because the hydraulic braking force acting on the valve operating member 51 in the right-hand direction in FIG. 1 is increased, the plunger 58 and the valve operating member 51 are maintained at their extreme right-hand positions in FIG. 1. When the control piston 26 is shifted to the left as mentioned above, the valve body 37 of the valve portion 39 is separated from the valve operating member 51 and is seated against the valve seat 38, thereby preventing communication between the input chamber 30 and the output chamber 31 (i.e., blocking the path 10 of the rear wheel brake system 8).

With the path 10 blocked, when the hydraulic braking pressure of the master cylinder 1 is further increased, since the force acting to the right on the control piston is increased, the control piston 26 is shifted to the right. As a result, the valve body 37 is separated from the valve seat 38 by the operating rod 50, thereby opening the path 10. By effecting such reciprocal movement of the control piston, the valve body 37 repeatedly contacts and separates from the valve operating member 51, thereby effecting what is known as cut control (wherein the hydraulic braking pressure transmitted to the rear wheel cylinders 7 is decreased, at a predetermined rate, relative to the hydraulic braking pressure of the master cylinder 1). During the cut control, the plunger 58 and the valve operating member 51 are maintained at their extreme right-hand positions in FIG. 1 since the inertia valve 65 closes the branch path 22.

When the vehicle load is increased, the hydraulic braking pressure Pbar necessary to decelerate the vehicle at the rate αg must be greater than the hydraulic braking pressure Lbar (low vehicle load). Although an increased force due to this greater hydraulic braking pressure Pbar acts in the left-hand direction in FIG. 1 on the control piston 26 and other components, the force of the load input lever 44 (acting toward the right in FIG. 1) is also increased due to the increase in the vehicle load. Thus, when the hydraulic braking pressure Pbar is generated, the plunger 58, valve operating member 51 and control piston 26 are all maintained at their extreme right-hand positions in FIG. 1, as in the aforementioned case.

When the hydraulic braking pressure Pbar is generated, the vehicle is decelerated at αg, whereby the branch path 22 is blocked by the inertia valve 65. As a result, the plunger 58 and the valve operating member 51 are maintained at their extreme right-hand positions in FIG. 1 and the urging force corresponding to the vehicle load and acting toward the right in FIG. 1 is applied to the control piston via the load input lever 44. Consequently, the hydraulic braking pressure required for shifting the control piston 26 away from the valve operating member 51 is increased as the vehicle load is increased. Thus, the cut point hydraulic pressure is changed and controlled so that it is increased as the vehicle load is increased.

On the other hand, if an abnormality occurs in the front wheel brake system 5, the predetermined deceleration αg cannot be achieved in spite of the increase in the hydraulic braking pressure generated by the master cylinder 1. Consequently, the valve body 69 of the inertia valve 65 will not close the second opening 68, whereby the branch path 22 will remain open. Thus, when the hydraulic braking pressure of the master cylinder 1 is increased, the pressure received by the plunger 58 is also increased, thereby increasing the force acting on the valve operating member 51 in the left-hand direction in FIG. 1. As a result, flange 49 of the valve operating member 51 abuts against the control piston 26, the valve body 37 is unseated from the valve seat 38, and the pressure received by the plunger 58 is transmitted to the control piston 26 via the engaging flange 49. Further, in addition to the increase in the force acting on the plunger 58, the force acting in the left-hand direction in FIG. 1 on the control piston 26 is increased by the hydraulic braking pressure in the input chamber 30. As a result, the sum of these two forces overcomes the sum of the three forces acting toward the right in FIG. 1, i.e., a force generated on the valve operating member 51 by the hydraulic pressure, the biasing force of the plunger spring 60 and a force representative of the vehicle load transmitted by the load input lever 44, thereby shifting the plunger 58, valve operating member 51 and control piston 26 together to the left in FIG. 1.

As a result, the valve portion 39 is opened so as not to block the hydraulic line leading to the rear wheel brake system 8, there by cancelling the cut control.

After the inertia valve 65 is closed as the deceleration increases, the operating pressure chamber 64 becomes hydraulically locked so that the plunger 58 cannot be returned, thereby continuing the cancellation of the cut control.

Incidentally, since the urging force acting on the control piston 26 is changed in accordance with the vehicle load, there arises a difference in the operating hydraulic pressure of the fail-safe mechanism for cancelling the cut control. However, the apparatus is so designed that substantially the same operation as mentioned above can be performed under all of the load conditions.

Figure 2:
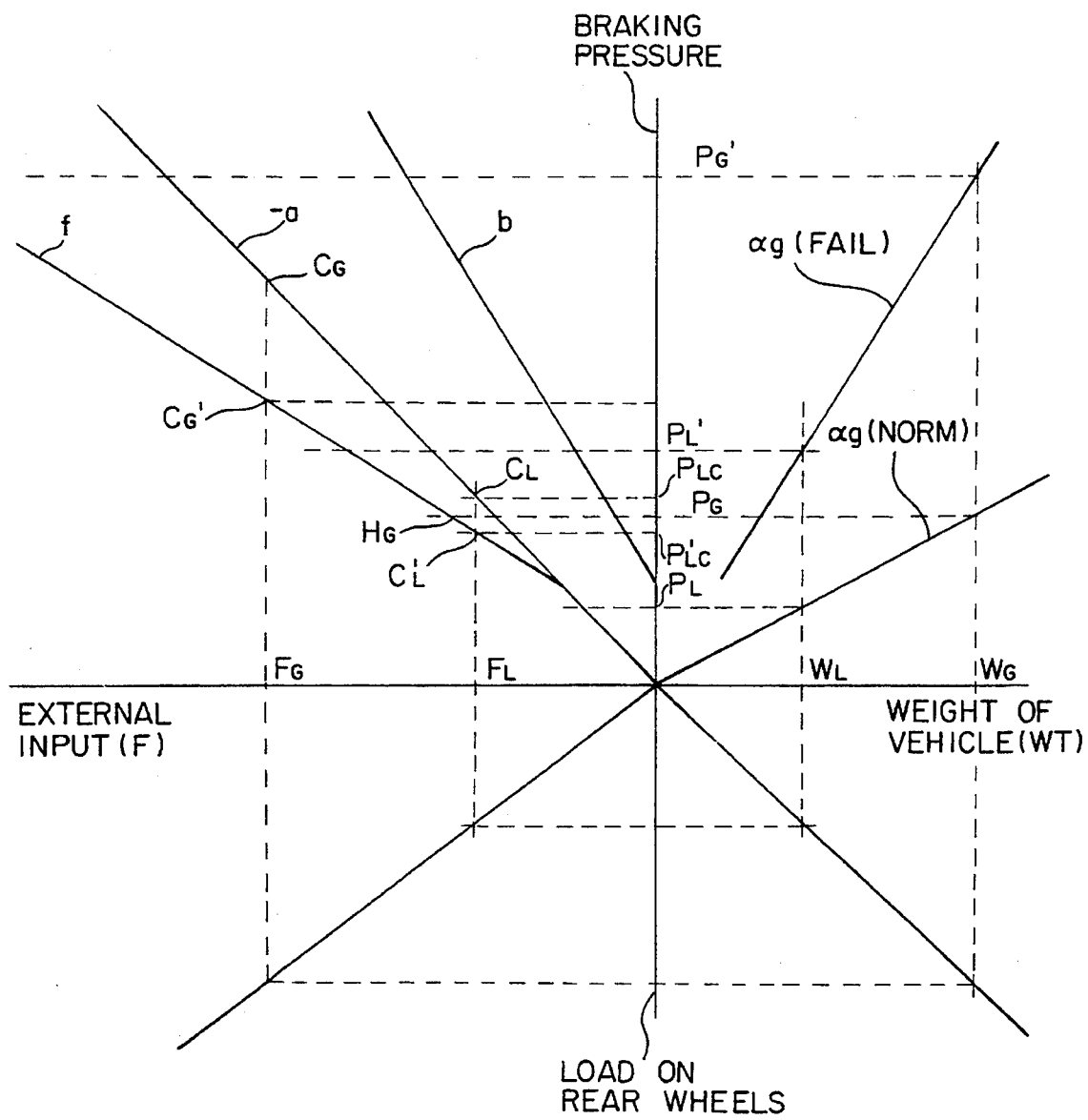
FIG. 2 is a graph of generating characteristics of the load-responsive hydraulic control apparatus.

The operation of the hydraulic control apparatus will be explained in more detail with reference to FIG. 2. In FIG. 2, the line "a" represents the relationship between the braking pressure and the reaction force of the control piston 26 directed against the external force form the load input lever 44. The line "b" represents the same relationship for the plunger 58. Due to the presence of the plunger spring 60, the plunger does not create any force against the external force until the braking pressure reaches a certain value. The line "f" represents the addition of these two lines "a" and "b".

The lines αg (FAIL) and αg (NORM) show the relationship between the braking pressure and weight of the vehicle when deceleration αg sufficient to cause the inertia valve 65 to close opening 68 is attained under a normal condition and at the time of failure of the front wheel brake system, respectively.

(1) When the weigh of the vehicle is $W_L$ (light)

(1-1) Normal condition:

The braking pressure for creating a deceleration αg when the weight of the vehicle is $W_L$ is $P_L$. Since the inertia valve is closed at $P_L$, no force represented by the line "b" is created. Thus, the line "f" is not applicable in this condition. When the pressure reaches $P_{LC}$ which is greater than $P_L$, the force urging the control piston leftwardly and represented by $C_L$ on line "a" reaches the external input $F_L$ corresponding to $W_L$. Thus, from this point, the cut control is achieved.

(1-2) At the time of failure:

The deceleration αg is attained at the braking pressure $P_L'$. THUS, in any pressure below $P_L'$, the plunger exerts forces represented by the line "b" and the line "f" becomes applicable. On the other hand, since the external input is $F_L$, the plunger and the control piston move leftwardly at the point $C_L'$ on the line "f" to provide the no-cut condition. In other words, the valve 38 is maintained in the open state.

When the braking pressure increases to reach $P_L'$, the inertia valve closes. However, since the operating chamber 64 is hydraulically isolated, the control piston and the plunger are kept at their extreme left-hand positions, thereby maintaining the no-cut condition.

(2) When the weight of the vehicle is $W_G$ (heavy)

(2-1) Normal condition:

The braking pressure four creating the deceleration αg when the weight of the vehicle is $W_G$ is $P_G$. Before the pressure reaches $P_G$, the inertial valve is open. Thus, the combined force has changed along the line "f". However, since the combined force $H_G$ is less than the external force $F_G$, the plunger is in the initial position (rightward position). When the inertia valve closes, the leftward force from the plunger represented by the line "b" is relieved. From this point, the leftward force changes on the line "a" and equals the external force $F_G$ when it reaches $C_G$. At this point, the control piston begins its operation and the cut control takes place.

(2-2) During failure:

The deceleration αg is attained at the braking pressure $P_G'$. Thus, at any pressure below $P_G'$, the plunger exerts forces represented by the line "b" and the line "f" become applicable. On the other hand, since the external input is $F_G$, the plunger and the control piston move leftwardly at the point $C_G'$ on the line "f" to provide the no-cut condition.

When the braking pressure increases to $P_G'$ the inertia valve closes. However, for the same reason as given in item (1-2) above, the no-cut condition is maintained.

Thus, if the abnormality occurs in the front wheel brake system 5 regardless of the magnitude of the vehicle load, the operating pressure of the inertia valve 65 is increased above the normal value. With inertia valve 65 opened, characteristics represented by the curve "f" (addition of the curves "a" and "b") are obtained and the cut point can be eliminated.

As mentioned above, according to the hydraulic control apparatus of the illustrated embodiment, since the cut control is canceled by indirectly detecting the abnormality of the front wheel brake system 5 by using the inertia valve 65, even when the hydraulic control apparatus is applied to a front and rear piping type of braking system, a pipe connecting the front wheel brake system and the apparatus is not required. Accordingly, the entire cost of the system can be reduced.

Further, even if the braking ability of the front wheel brake system is hampered, for example, due to fade, vapor-lock or clogging of the pipe in spite of the normal hydraulic pressure, the braking force is maintained in the rear wheel brake system by cancelling the cut control.

Furthermore, in a vehicle having an ABS system employing an integral master cylinder, since an abnormality in the front wheel brake system is determined on the basis of the deceleration by the present invention, hydraulic pressure fluctuations in the front wheel brake system produced by normal ABS control will not be erroneously determined as an abnormality.

What is claimed is:

1. A load-responsive hydraulic control apparatus incorporated in a brake system having a front wheel brake system connecting a master cylinder and front wheel cylinders and a rear wheel brake system connecting said master cylinder and rear wheel cylinders, comprising:

a valve portion for permitting and preventing communication between said master cylinder and the rear wheel cylinders of said rear wheel brake system;

a valve operating member capable of moving to and separating from said valve portion and adapted to close said valve portion when it is separated from said valve portion;

a control piston for holding said valve portion and adapted so that it is shifted when hydraulic braking pressure of said master cylinder reaches a predetermined cut point hydraulic pressure, thereby separating said valve portion from said valve operating member to prevent communication between said master cylinder and the rear wheel cylinders of said rear wheel brake system, and said control piston is reciprocally shifted when the hydraulic braking pressure of said master cylinder is further increased, thereby causing said valve portion and said valve operating member to repeatedly move to and separate from one another to decrease the hydraulic braking pressure transmitted to said rear wheel cylinders, at a predetermined rate, relative to the hydraulic braking pressure of said master cylinder;

an input member for inputting a force corresponding to a vehicle load to said control piston in direction that causes said valve portion to move to said valve operating member;

a branch path branched from said rear wheel brake system between said valve portion and said master cylinder;

a plunger for receiving hydraulic pressure from said branch path and for positioning said valve operating member at a valve portion approach position when the received hydraulic pressure reaches a predetermined shifting pressure; and an inertia valve for blocking said branch path when predetermined deceleration takes place.

2. A hydraulic control apparatus according to claim 1, wherein said valve portion comprises a valve seat formed in said control piston, a valve body movably retained in the control piston and a spring for biasing the valve body against said valve seat.

3. A hydraulic control apparatus according to claim 1, wherein said plunger is biased by a plunger spring against said hydraulic pressure from said branch path so that the plunger spring determines said predetermined shifting pressure.

4. A hydraulic control apparatus according to claim 1, wherein said inertia valve comprises a valve chamber provided in an intermediate portion of said branch path and a valve body movable in said chamber, said valve chamber having front and rear walls defining ports through which the branch path opens to the chamber, and a bottom wall inclined upwardly and forwardly so that the valve body can roll up to the port in the front wall only when said predetermined deceleration takes place.

* * * * *